| United States Patent [19] | [11] | 4,325,178 |
|---|---|---|
| Pruehs | [45] | Apr. 20, 1982 |

[54] SCREW ANCHORING DEVICE AND METHOD

[75] Inventor: Leslie L. Pruehs, Louisville, Ky.

[73] Assignee: General Electric Company, Louisville, Ky.

[21] Appl. No.: 156,725

[22] Filed: Jun. 5, 1980

[51] Int. Cl.³ .................... B23P 3/00; B23P 25/00; F16B 37/04

[52] U.S. Cl. .................................. 29/458; 29/460; 29/526 R; 10/86 R; 24/217 R; 24/305; 264/46.5; 411/116; 411/180; 411/526; 411/528

[58] Field of Search ............. 29/458, 460, 413, 526 R; 10/86 R; 52/735, 704; 411/82, 526, 116, 527, 528, 529; 24/217 R, 305; 248/239; 264/46.7, 46.5, 261; 174/50

[56] References Cited

U.S. PATENT DOCUMENTS

| 2,775,917 | 1/1957 | Ferguson | 411/527 |
|---|---|---|---|
| 3,264,699 | 8/1966 | Knowlton | 24/305 |
| 3,281,522 | 10/1966 | Anisfield | 174/50 |
| 3,334,410 | 8/1967 | Forward | 29/460 X |
| 3,369,336 | 2/1968 | Buzicky | 264/46.5 X |
| 3,383,440 | 5/1968 | Chaldekas | 264/46.5 |
| 3,802,476 | 4/1974 | Hoadley | 411/82 |
| 3,826,458 | 7/1974 | Fisher | 248/239 |
| 3,917,206 | 11/1975 | Fisher | 248/239 |
| 4,040,463 | 8/1977 | Petrus | 248/239 X |
| 4,279,341 | 7/1981 | Pleickhardt | 411/527 X |

Primary Examiner—Charlie T. Moon
Attorney, Agent, or Firm—Frederick P. Weidner; Radford M. Reams

[57] ABSTRACT

A screw anchoring device and method for preassembled aperture sealing attachment with an apertured panel to confine insulating material foamed in place between the panel and a spaced wall. The screw anchoring device includes a flat portion having a central helical screw receiving impression with a retained knock-out central area capable of being displaced by a screw. The device is secured to the apertured panel with a screw receiving impression overlying the panel aperture. The screw anchor device has one or more wing portions formed integrally with the flat portion, said wing portions diverging from the plane of the flat portion in a direction away from the screw receiving impression and adapted to be imbedded in the foamed insulating material. In performing the method, a utility component is placed on the opposite side of the panel from the screw anchoring device overlying the panel aperture and a screw is passed first through the utility component then through the panel aperture and then through the screw anchoring device whereby the knock-out portion of the device is displaced and the screw is retained in the central helical screw receiving impression.

10 Claims, 9 Drawing Figures

SCREW ANCHORING DEVICE AND METHOD

BACKGROUND OF THE INVENTION

This invention is concerned with the provision of a screw anchoring device and method which screw anchoring device is to be preassembled with an apertured wall for subsequent reception of a screw through the aperture for mounting any one of a variety of utility components to the exposed side of the wall surface in the finished structure. For example, the finished structure may be a refrigerator in which the apertured wall constitutes the liner wall attached to an outer cabinet wall structure with the space between the walls filled with an insulating material which may be foamed in situ.

It is desirable in screw anchoring devices and methods of assembly to provide an anchoring device for a screw or other type fastener wherein the anchoring device includes a portion which may be preassembled to one side of an apertured panel sealing the aperture therethrough against egress of material, as for example, foam material applied to that side of the panel. It is further desirable for ease of assembly, to provide such an anchoring device with a helical screw impression in a portion of the device and having means for properly locating the screw impression with respect to the panel aperture to be sealed for subsequent reception of a screw fastener.

Several screw or other fastener anchoring devices have been utilized in the past. Such devices are shown, for example, in U.S. Pat. Nos. 3,264,699; 3,802,476; 3,826,458; 3,917,206; and 4,040,463.

By my invention, there is provided a screw anchor device and method of assembly which will accomplish the above desirable results and which is simple to manufacture and easy to utilize for its intended purpose.

SUMMARY OF THE INVENTION

According to one aspect of my invention, there is provided a screw anchoring device and method for preassembled apertured sealing attachment with an apertured panel to confine insulating material foamed in place between the panel and a spaced wall. The device includes a flat portion having a central helical screw receiving impression with a retained knock-out central area capable of being displaced by a screw. Means are provided for securing the device to the apertured panel with the screw receiving impression overlying the panel aperture. The screw anchoring device further includes one or more wing portions formed integrally with the flat portion and the wing portions diverge from the plane of the flat portion in a direction away from the screw receiving impression and are adapted to be imbedded in the foamed insulating material. The method of my invention is for securing a utility component to a panel of composite structure which has an attached spaced wall and foamed insulation material therebetween and utilizes the screw anchoring device described above.

DESCRIPTION OF THE PREFERRED EMBODIMENT

Figure 1:
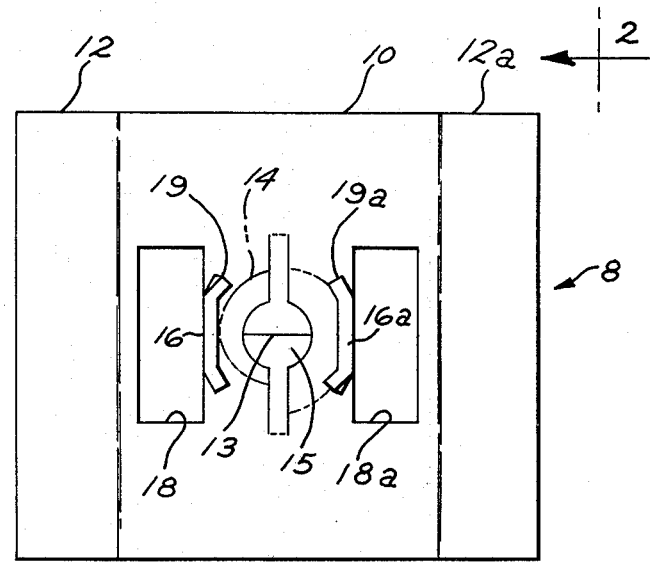
FIG. 1 is a bottom plan view embodying one form of the screw anchoring device of the present invention.
Figure 2:
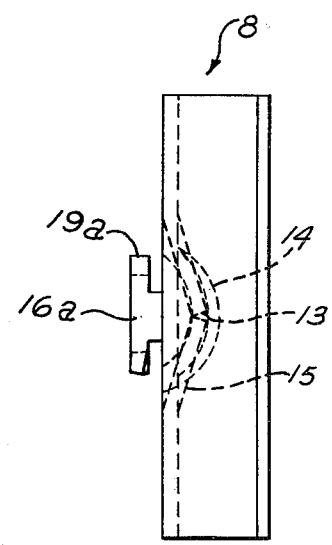
FIG. 2 is a side elevational view taken along lines 2—2 of FIG. 1.
Figure 3:
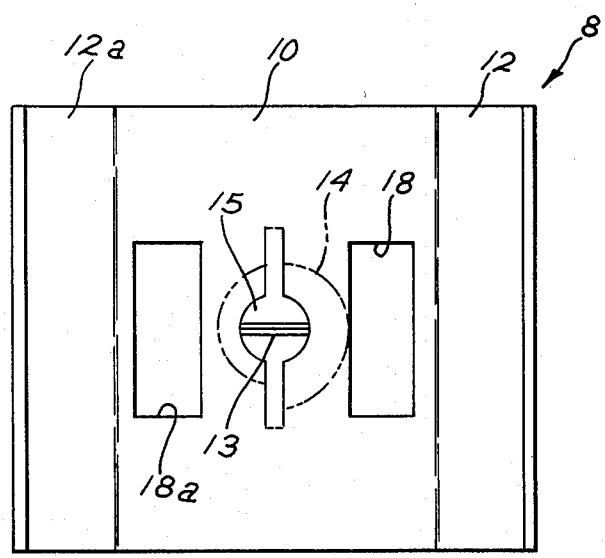
FIG. 3 is a top plan view embodying one form of the screw anchoring device of FIGS. 1 and 2.

With reference to FIGS. 1, 2, and 3 of the drawings, the screw anchoring device 8 includes a plate or flat portion 10 which may be of any desired shape but is shown as somewhat rectangular with one or more angled wing portions 12, 12a along opposite edges thereof. The flat portion 10 has a central helical screw impression 14, the center of which has a retained knock-out central area 15. That is, the knock-out area 15 may be formed by partially lancing or coining the area but retaining the area in position as shown in FIGS. 1–3. The knock-out area 15 can be of any desired configuration. I have found the configuration shown in the drawing to be quite satisfactory. Preferably, the knock-out area 15 is split in the middle as by a lance line 13 to provide ease of subsequent displacement. The wing portions 12, 12a diverge from the plane of the flat portion 10 in a direction away from the screw receiving impression 14. At opposite sides of the screw impression 14, there are provided tabs 16, 16a formed from material of the flat portion 10 in opposite direction to that of the wing portions 12, 12a and leaving openings 18, 18a in the flat portion 10. The tabs 16, 16a each have two terminal end portions 19, 19a, the description and function of which will be described later.

Figure 4:
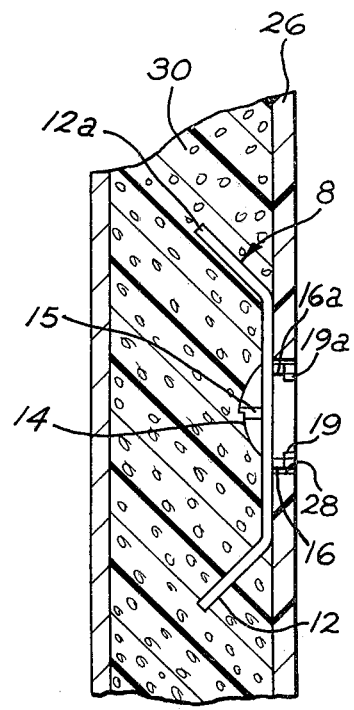
FIG. 4 is a fragmentary view, partially in section, showing the screw anchoring device secured to an apertured panel and additionally held in place by foamed insulation material.

The screw anchoring device 8 can be applied to a surface 41 of a panel 26, such as a refrigerator interior liner, as shown in FIG. 4. Such a panel will have a predetermined pattern of apertures formed therethrough depending upon the ultimate type of structure in which the panel is to be incorporated. Using a refrigerator cabinet as an example, the apertures in the liner or panel 26 will be selectively located to provide for shelving or shelf support, freezer unit supports and the like utility components. In FIG. 4, there is shown one such panel aperture 28. Prior to application to the foamed in situ insulating material 30, the screw anchoring device 8 is applied to the surface 25 of the panel 26. The screw anchoring device 8 may be applied to the surface 25 by any suitable means such that the screw receiving impression 14 overlies the panel aperture 28. The foamed in situ insulation material is introduced between the panel 26 and a spaced wall 31, such as the outer cabinet wall of a refrigerator and during the foaming process, the wing portions 12, 12a become imbedded in the insulating material. When the material solidifies, it bonds the panel 26 to the spaced wall 31 and also prevents subsequent rotation of the screw anchoring device 8.

Figure 5:
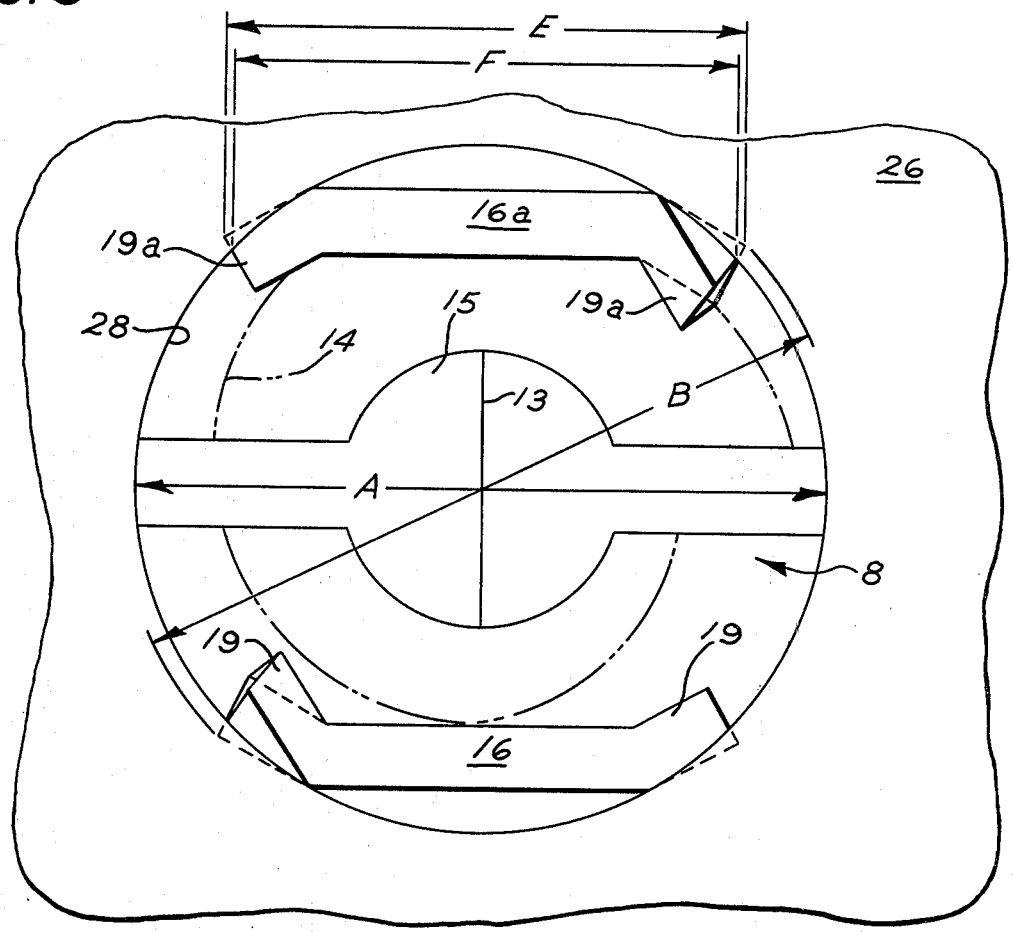
FIG. 5 is a bottom plan view embodying one form of the screw anchor device in position for insertion into an apertured panel.
Figure 6:
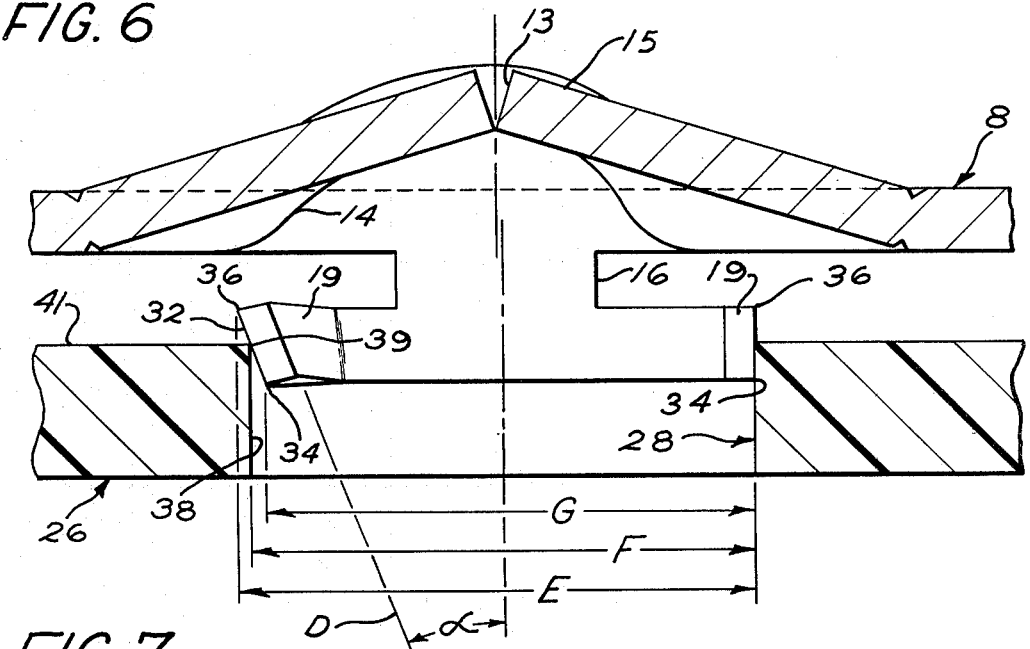
FIG. 6 is a cross-sectional view showing the screw anchoring device entering an apertured panel.
Figure 7:
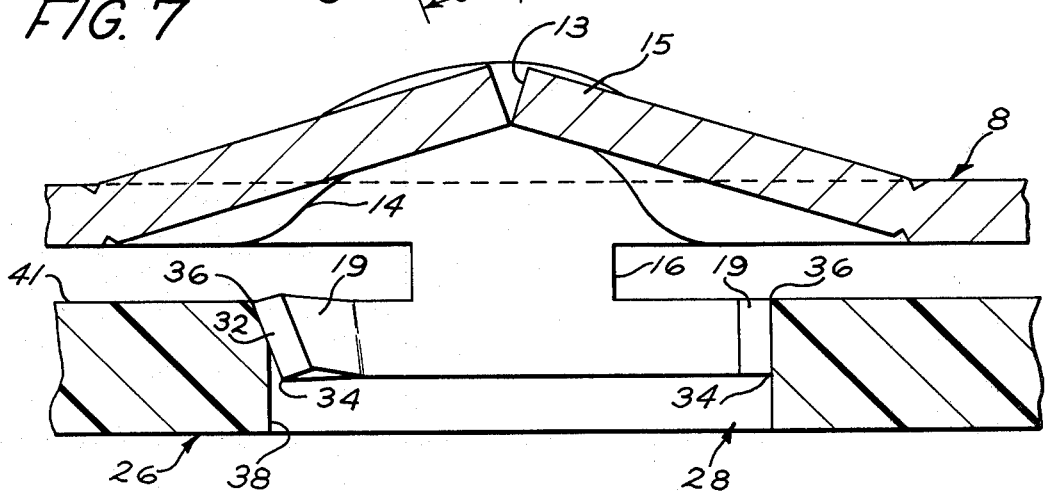
FIG. 7 is similar to FIG. 6 showing the screw anchor device partially inserted in an apertured panel.
Figure 8:
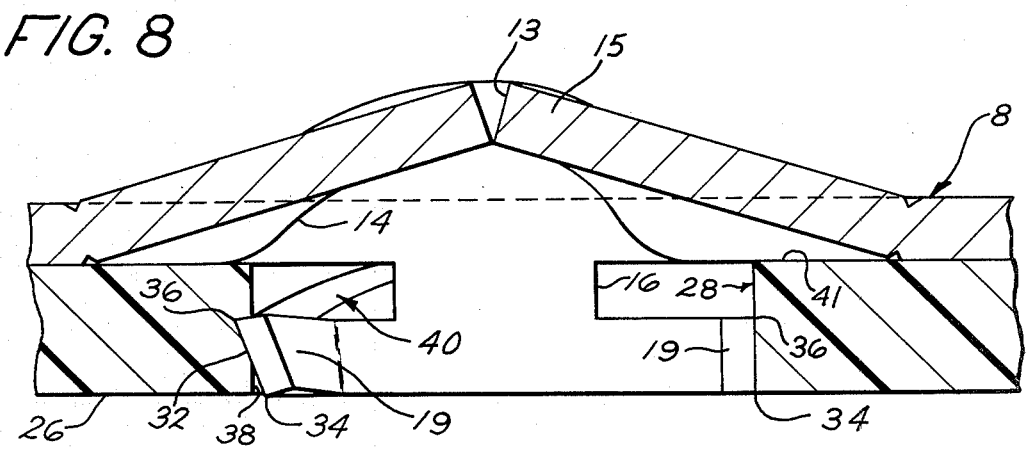
FIG. 8 is similar to FIG. 7 showing the screw anchor device secured to an apertured panel.

While any suitable means of securing the screw anchor device 8 to the panel 26 may be employed, the preferred embodiment of my invention utilizes the securing means shown particularly in FIGS. 5-8 and will now be described. As shown in FIG. 5, the panel 26 has an aperture 28 which is circular and has a diameter distance indicated as A. FIG. 5 is a view up through the aperture 28 to the overlying screw anchor device 8. As can be seen through the aperture 28, the screw anchor device 8 shows the helical screw impression 14 including the knock-out area 15. Overlying the aperture 28 are the tabs 16, 16A. These tabs are spaced from each other such that the diameter of their outside circumference, indicated as line B in FIG. 5, is slightly greater than the diameter of the panel aperture 28. The slight difference in diameter allows the screw anchor device 8 to frictionally engage the side wall 38 of aperture 28 by having the tabs 16, 16A inserted into the aperture and retained with sufficient frictional force to allow the subsequent operations to be performed as will be described later. The preferred embodiment as particularly shown in FIGS. 6-8 has a terminal end 19 twisted or bent outwardly such that each tab has one of the terminal ends 19 formed at an acute angle relative to the central axis of the device as viewed in lateral cross section. As shown in FIG. 6, the central axis is designated line C and the other leg or line D of the angle shows the inclination of the terminal end 19 with the included angle being designated alpha. As can be seen in FIGS. 6-8, by forming the terminal end 19 at an acute angle relative to the central axis of the device, there is provided an inclined edge 32 which diverges away from the central axis of the screw anchor device 8 in an upward direction. Inclined edge 32 terminates at the lower end at a point 34 and at the opposite upper end at a point 36. It will be noted that the distance designated E in FIGS. 5 and 6 between the point 36 of tab terminal end 19 and the terminal end 19a at the opposite side is slightly greater than the cord distance, designated F in FIGS. 5 and 6, of the aperture 28 in which it is to be placed. By providing inclined edge 32, there is some tolerance for the size of the aperture 28 and that tolerance is the difference between the distance of point 34 to its opposite respective point 34, the distance being designated G in FIG. 6, and between point 36 and its opposite point 36, designated distance E. Moreover, point 36 on the terminal end 19 which is formed at an acute angle relative to the central axis of the device acts as a cutting or scoring edge so that when the tabs 16 of the screw anchor device 8 are placed in the aperture 28 and rotated, upper point 36 of the terminal end 19 digs into the side wall 38 of the aperture 28 and affords considerable friction engagement so that the screw anchor device 8 is securely fastened to the panel 26. The sequence of securing the device 8 to the panel 26 is shown in FIGS. 6, 7 and 8 wherein the screw anchor device 8 is positioned with the tabs 16 overlying the aperture 28 and make initial contact with the side wall 38 of the aperture 28 as shown in FIG. 6 by the inclined edge 32 contacting the edge 39 of the aperture 28. Applying further urging force to the screw anchoring device 8 along with a rotating movement, the upper point 36 terminal end 19 gouges or scores the sidewall 38 of the aperture 28 until the flat portion 10 of the device 8 contacts the upper surface 41 of the panel 26. As shown in FIG. 8, the upper point 36 of terminal end 19 has scribed a path 40 in the side wall 38.

While FIGS. 6-8 only show one tab 16 of the screw anchoring device 8 being positioned in the apertured panel 26, it will be understood, as shown in FIG. 5, that tabs 16, 16a both will engage the side wall 38 of aperture 28. The terminal ends 19, 19a, of the respective tabs 16, 16a which are diagonally opposite each other, each are formed at an acute angle relative to the central axis of the device as received in lateral cross section. The other terminal ends 19, 19a of each of the tabs 16, 16a, which are also diagonally opposite each other, are not formed at an acute angle relative to the central axis of the screw anchoring device 8 as shown in FIG. 5. Whether or not, none, one, or more of the terminal ends 19, 19a are formed at an acute angle relative to the central axis of the device, is a design choice depending upon the amount of securement desired for the purpose intended. I have found that having two terminal ends 19, 19a which are diagonally opposite each other formed at an acute angle relative to the central axis of the device works quite well.

Figure 9:
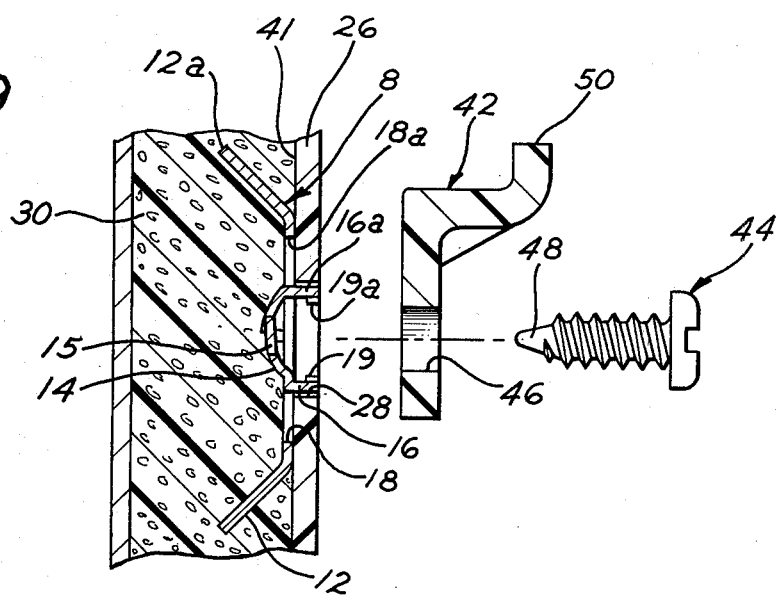
FIG. 9 is a cross-sectional view showing the screw anchor device secured to the apertured panel with the foamed insulation material applied to that surface and sealed against egress through the panel aperture, and further showing the location of a utility component on the opposite surface of the panel in position to be attached thereto upon insertion of the illustrated screw element.

The method of securing a utility component 42 (FIG. 9) to a panel of composite structure having an attached spaced wall and foamed insulation material therebetween will now be discussed. With reference to FIG. 9, the screw anchor device 8 is secured to the panel 26 as described above with the final operation resulting in the structure illustrated. The wing portions 12, 12a serve as convenient finger grip surfaces for facilitating initial placement of the screw anchor device 8 on the panel surface in proper position with the tabs 16, 16a projecting into the panel aperture 28 and the rotational movement of the screw anchor device 8 may be easily accomplished so that the tabs frictionally engage the side wall 38 of the aperture 28. When so assembled to the panel 26 an outer cabinet wall 31 or other structure may be then assembled with the panel 26 to provide a space therebetween and in which the foamed insulating material 30 may be placed, as by pouring or foaming in situ. The panel aperture 28 is sealed against escape of the insulating material 30 by the knock-out area 15. The wing portions 12, 12a dovetail with the insulating material to further lock the screw anchor device 8 in position and prevent rotation thereof upon application of a screw 44.

After the insulating material 30 is set up, a utility component 42 is located on the accessible face of the panel 26 with its aperture 46 aligned with the panel aperture 28. Thus, the screw 44 may be passed through the aligned aperture 46, then through the panel aperture 28 and then comes in contact with the knock-out portion or area 15 in the center of the helical screw impression 14 of the screw anchor device 8. By sufficient force applied to the knock-out area by the lead-in end 48 of the screw 44, the knock-out area 15 is displaced as by bending or breaking away from the flat portion 10 and the screw 44 is allowed to threadedly engage the helical screw impression 14 and be tightened to effectively mount the utility component 42 to the exposed surface of the panel 26. After the screw is threaded home, it will serve as a further interlock with the insulating material 30 to add to the strength and rigidity of the supported utility component 42 which may have a hooked end 50 as a shelf support, or other configuration.

The foregoing is a description of the preferred embodiment of the invention and it should be understood that variations may be made thereto without departing from the true spirit of the invention as defined in the appended claims.

What is claimed is:

1. A screw anchoring device for pre-assembled aperture sealing attachment with an apertured panel to confine insulating material foamed in place between the panel and a spaced wall comprising;

a flat portion having a central helical screw receiving impression with a retained knock-out central area capable of being displaced by a screw, means for securing the device to the apertured panel with the screw receiving impression overlying the panel aperture, and one or more wing portions formed integrally with the flat portion, said wing portions diverging from the plane of the flat portion in a direction away from the screw receiving impression and adapted to be imbedded in the foamed insulating material.

2. The screw anchoring device of claim 1 wherein the means for securing the device to the apertured panel is a pair of up-standing tabs projecting from one face of the flat portion at opposite sides and adjacent to said screw receiving impression, said tabs being dimensioned to frictionally engage the sidewall of the panel aperture.

3. The screw anchoring device of claim 2 wherein the tabs are formed by lancing and bending material from within the margins of said flat portion.

4. The screw anchoring device of claim 2 wherein the diameter of the outside circumference of the tabs is slightly greater than the diameter of the panel aperture for frictional engagement therewith.

5. The screw anchoring device of claim 2 wherein at least one of the up-standing tabs has a terminal end formed at an acute angle relative to the central axis of the device as viewed in lateral cross section such that the outside diameter distance between the angled terminal end and the diagonally opposite terminal end of the other tab is slightly greater than the diameter of the panel aperture.

6. The screw anchoring device of claim 1 wherein the retained knock-out central area is split in the center thereof.

7. The method of securing a utility component to a panel of a composite structure having an attached spaced wall and foamed insulating material therebetween comprising;

forming an aperture in the panel;

securing a screw anchoring device to the panel, said device having a flat portion with a central helical screw receiving impression with a retained knock-out central area capable of being displaced by a screw and having one or more wing portions formed integrally with the flat portion, said wing portions diverging from the plane of the flat portion in a direction away from the screw impression, said screw anchoring device being secured to the panel such that the screw receiving impression overlies the panel aperture;

foaming insulation material between the panel and the spaced wall, with the wings of the device being imbedded therein;

placing the utility component on the opposite side of the panel from the screw anchoring device and overlying the panel aperture; and passing a screw first through the utility component, then through the panel aperture and then through the screw anchoring device whereby the knock-out portion of said device is displaced and the screw is retained in the central helical screw receiving impression.

8. The method of claim 7 wherein securing the screw anchoring device to the panel is by forming a pair of up-standing tabs projecting from one face of the flat portion at opposite sides and adjacent to said screw receiving impression, the diameter of the outside circumference of the tabs being slightly greater than the diameter of the panel aperture, and urging the tabs into frictional engagement with the sidewall of the panel aperture.

9. The method of claim 8 wherein the forming of the tabs is by lancing and bending material from within the margins of said flat portion.

10. The method of claim 8 where at least one of the up-standing tabs has a terminal end that is formed by bending at an acute angle relative to the central axis of the device as viewed in lateral cross section such that the outside diameter distance between the angled terminal end and the diagonally opposite terminal end of the other tab is slightly greater than the diameter of the panel aperture and rotating the tabs into frictional engagement with the sidewall of the panel aperture.

* * * * *